(12) United States Patent
Okamoto et al.

(10) Patent No.: US 11,065,580 B2
(45) Date of Patent: Jul. 20, 2021

(54) SEPARATION MEMBRANE ELEMENT

(71) Applicant: TORAY INDUSTRIES, INC., Tokyo (JP)

(72) Inventors: Yoshiki Okamoto, Shiga (JP); Akshay Garg, Shiga (JP); Kentarou Takagi, Shiga (JP); Hiroho Hirozawa, Shiga (JP); Tamotsu Kitade, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 156 days.

(21) Appl. No.: 16/346,027

(22) PCT Filed: Oct. 24, 2017

(86) PCT No.: PCT/JP2017/038259
§ 371 (c)(1),
(2) Date: Apr. 29, 2019

(87) PCT Pub. No.: WO2018/079511
PCT Pub. Date: May 3, 2018

(65) Prior Publication Data
US 2019/0262775 A1    Aug. 29, 2019

(30) Foreign Application Priority Data

Oct. 31, 2016    (JP) .............................. JP2016-212567

(51) Int. Cl.
*B01D 63/06*    (2006.01)
*B01D 63/00*    (2006.01)
(Continued)

(52) U.S. Cl.
CPC ............ *B01D 63/06* (2013.01); *B01D 63/00* (2013.01); *B01D 63/10* (2013.01); *B32B 1/08* (2013.01); *C02F 1/44* (2013.01)

(58) Field of Classification Search
CPC ........ B01D 63/06; B01D 63/00; B01D 63/10; B01D 63/103; B01D 61/025; B01D 65/02;
(Continued)

(56) References Cited

U.S. PATENT DOCUMENTS 8,425,773 B2 *    4/2013   Bonta ................. B01D 63/106
                                                  210/321.85
2011/0042294 A1   2/2011   Bonta et al.
2017/0361280 A1  12/2017   Hirozawa et al.

FOREIGN PATENT DOCUMENTS

CN           1607028 A    4/2005
CN        201244449 Y    5/2009
(Continued)

OTHER PUBLICATIONS

International Search Report, issued in PCT/JP2017/038259, PCT/ISA/210, dated Dec. 12, 2017.
(Continued)

*Primary Examiner* — Waqaas Ali
(74) *Attorney, Agent, or Firm* — Birch, Stewart, Kolasch & Birch, LLP

(57) ABSTRACT

According to the present invention, even when a high recovery ratio operation is performed, the influence of concentration of ingredients to be separated in the feed fluid can be reduced, the concentration polarization can be prevented by increasing the turbulence effect on the membrane surface, and the fluid permeation performance and the separation performance of the separation membrane element can be maintained.

8 Claims, 10 Drawing Sheets

(51) Int. Cl.
   *B01D 63/10*   (2006.01)
   *C02F 1/44*    (2006.01)
   *B32B 1/08*    (2006.01)

(58) Field of Classification Search
   CPC .......... B01D 65/08; B01D 69/10; B32B 1/08;
                  B32B 27/12; B32B 2262/0276; B32B
                  2307/51; B32B 2262/0207; B32B
                  2307/732; B32B 2597/00; B32B
                  2262/0223; B32B 2262/0253; B32B 3/08;
                  B32B 5/26; B32B 27/36; B32B 27/302;
                  B32B 5/026; B32B 3/266; B32B 27/32;
                  B32B 5/022; B32B 5/028; B32B 3/30;
                  C02F 1/44; C02F 2103/08; C02F 1/441;
                                                Y02A 20/141
   See application file for complete search history.

(56)            References Cited

FOREIGN PATENT DOCUMENTS

| CN | 202136922 U | | 2/2012 |
| --- | --- | --- | --- |
| CN | 102470293 A | | 6/2012 |
| JP | 55-102902 U | | 7/1980 |
| JP | S55102902 | * | 7/1980 |
| JP | 60-166005 A | | 8/1985 |
| JP | 62057609 A | * | 3/1987 |
| JP | 2-59027 A | | 2/1990 |
| JP | 5-208120 A | | 8/1993 |
| JP | 11-57429 A | | 3/1999 |
| JP | 2010-125418 A | | 6/2010 |
| JP | 2012-66239 A | | 4/2012 |
| JP | 2013-71098 A | | 4/2013 |
| JP | 2013071098 A | * | 4/2013 |
| JP | 2015-27651 A | | 2/2015 |
| WO | WO 2016/104419 A1 | | 6/2016 |

OTHER PUBLICATIONS

Written Opinion of the International Searching Authority, issued in PCT/JP2017/038259, PCT/ISA/237, dated Dec. 12, 2017.
Chinese Office Action and Search Report for Chinese Application No. 201780067268.9, dated Feb. 2, 2021, with English translation.

* cited by examiner

SEPARATION MEMBRANE ELEMENT

TECHNICAL FIELD

The present invention relates to a separation membrane element for use in separation of ingredients contained in fluids such as liquid and gas.

BACKGROUND ART

In the recent technique for removal of ionic substances contained in seawater, brackish water or the like, separation methods utilizing separation membrane elements have found increasing uses as processes for energy savings and conservation of resources. Separation membranes adopted in the separation methods utilizing separation membrane elements are classified into five groups according to their pore sizes and separation function, namely microfiltration membranes, ultrafiltration membranes, nanofiltration membranes, reverse osmosis membranes and forward osmosis membranes. These membranes have been used, for example, in production of drinkable water from seawater, brackish water, water containing deleterious substances, or the like, production of ultrapure water for industrial uses, effluent treatment, recovery of valuable substances, or the like, and have been used properly according to ingredients targeted for separation and separation performance requirements.

Separation membrane elements have various shapes, but they are common in that they feed the feed fluid to one surface of a separation membrane and obtain permeated fluid from the other surface thereof. By having a plurality of separation membranes tied in a bundle, each separation membrane element is configured to extend the membrane area per separation membrane element, in other words, to increase the amount of the permeated fluid obtained per separation membrane element. Various types of shapes, such as a spiral type, a hollow fiber type, a plate-and-frame type, a rotating flat-membrane type and a flat-membrane integration type, have been proposed for separation membrane elements, according to their uses and purposes.

For example, spiral-type separation membrane elements have been widely used in reverse osmosis filtration. The spiral-type separation membrane element includes a perforated central tube and a stack wound up around the perforated central tube. The stack is formed by stacking a feed-side channel material for feeding the feed fluid (for example, water to be treated) to a surface of a separation membrane, a separation membrane for separating ingredients contained in the feed fluid and a permeate-side channel material for leading the permeate-side fluid having passed through the separation membrane to the perforated central tube. In the spiral-type separation membrane element, it is possible to apply pressure to the feed fluid, and therefore, it has been preferably used in that a larger amount of the permeated fluid can be taken out.

In recent years, demands for lowering fresh water production cost have increased, and higher performance of separation membrane elements is required. For examples, in order to improve the separation performance of the separation membrane element, a channel material member and a separation membrane element structure are proposed which can enhance the turbulence effect on the membrane surface and prevent the concentration polarization.

Specifically, Patent Document 1 and Patent Document 2 propose a separation membrane element having an increased turbulence effect on the membrane surface by providing protruding portions and grooves on a feed-side surface of the separation membrane.

BACKGROUND ART DOCUMENT

Patent Document

Patent Document 1: JP-A-2010-125418
Patent Document 2: JP-A-2012-066239

SUMMARY OF THE INVENTION

Problems that the Invention is to Solve

In the separation membrane elements described in Patent Document 1 and Patent Document 2, the turbulence effect on the membrane surface can be increased and the concentration polarization can be prevented, but particularly in the case of performing high recovery ratio operation (recovery ratio: the ratio of the amount of permeated fluid to the amount of the feed fluid to be fed to the element), the flow rate of the feed fluid decreases as it approaches the feed fluid outlet, so that the ingredients to be separated in the feed fluid are concentrated, the turbulence effect on the membrane surface is reduced, and thus the concentration of the ingredients to be separated on the membrane surface is increased. Therefore, the fluid permeation performance and separation performance are lowered, and scales are likely to occur. Therefore, an object of the present invention is to provide a separation membrane element which prevents an increase in the concentration of the ingredients to be separated on the membrane surface even at a high recovery ratio operation and which has high fluid permeation performance and separation performance.

Means for Solving the Problems

In order to achieve the above-described object, a separation membrane element according to the present invention is a separation membrane element including:
 a perforated central tube;
 a plurality of separation membrane pairs each of which includes a separation membrane having a feed-side face and a permeate-side face, the plurality of separation membrane pairs being arranged so that the permeate-side faces face each other;
 a feed-side channel material provided between the feed-side faces of the separation membrane pair; and
 a permeate-side channel material provided between the permeate-side faces of the separation membrane pairs,
 in which the separation membrane pairs, the feed-side channel material, and the permeate-side channel material are wound around the perforated central tube to form a wound body,
 in the feed-side faces of the separation membrane pair, among four portions of end faces and ends which are one end face and the other end face in a longitudinal direction of the perforated central tube and an inner peripheral end and an outer peripheral end in a direction perpendicular to the longitudinal direction of the perforated central tube, two or more portions of the end faces or ends are opened by 5% or more, respectively,
 the plurality of separation membrane pairs include at least one first separation membrane pair and at least one second separation membrane pair, and the first separation membrane pair and the second separation membrane pair are different from each other in a combination of the opened end faces or ends.

Advantage of the Invention

According to the present invention, even when a high recovery ratio operation is performed, the influence of concentration of ingredients to be separated in the feed fluid can be reduced, the concentration polarization can be prevented by increasing the turbulence effect on the membrane surface, and the fluid permeation performance and the separation performance of the separation membrane element can be maintained.

MODE FOR CARRYING OUT THE INVENTION

Hereinafter, embodiments of the separation membrane element according to the present invention are described in detail.

(1) Outline

Figure 1:
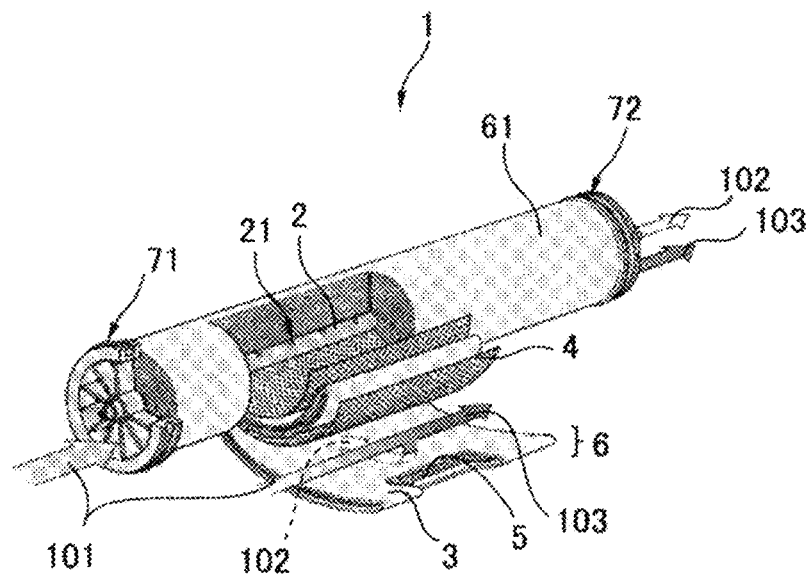
FIG. 1 is an exploded perspective view showing a general separation membrane element.

FIG. 1 shows an exploded perspective view of a separation membrane element 1. As shown in FIG. 1, the general separation membrane element 1 includes a perforated central tube 2, a separation membrane 3, a feed-side channel material 4, a permeate-side channel material 5, and telescope prevention plates 71 and 72. The separation membrane 3, the feed-side channel material 4 and the permeate-side channel material 5 are stacked to form a membrane unit 6. The feed-side channel material 4 forms a feed-side flow channel between two separation membranes 3 or between the folded separation membrane 3, and the permeate-side channel material 5 forms a permeate-side flow channel between two separation membranes 3. The membrane unit 6 is spirally wound around the perforated central tube 2 to form a wound body 61. A filament or a film (not shown) is wound around the wound body 61.

The telescope prevention plates 71 and 72 are attached to both ends of the wound body 61 in order to prevent the wound body 61 from being deformed into a telescope shape. However, in the case of water purifier applications that operate at a low pressure, it is not necessary to provide the telescope prevention plates 71 and 72. In a specific embodiment of the present invention, a cap 73 may be provided in place of the telescope prevention plates.

(2) Separation Membrane

<Outline>

As the separation membrane 3, a membrane having separation performance according to its usage, its purpose and the like is used. The separation membrane 3 may be formed by a single layer, or it may be a composite membrane including a separation functional layer and a substrate. In the composite membrane, there may be a porous supporting layer between the separation functional layer and the substrate.

Here, a face having the separation functional layer is referred to as a feed-side face, the face opposite to the face having the separation functional layer is referred to as a permeate-side face, and the separation membrane formed in a state where the feed-side faces face each other is referred to as a separation membrane pair.

<Separation Functional Layer>

The separation functional layer may be a layer having both a separation function and a support function, or it may be a layer having a separation function alone. The "separation functional layer" refers to a layer having at least a separation function.

When the separation functional layer has both a separation function and a support function, a layer containing a polymer selected from the group consisting of cellulose, polyvinylidene fluoride, polyether sulfone and polysulfone as a main component is preferably applied to the separation functional layer.

On the other hand, as the separation functional layer, a crosslinked polymer is preferably used in terms of easy pore size control and excellent durability. Particularly, in terms of excellent performance for separating ingredients in a feed fluid 101, a polyamide separation functional layer obtained by polycondensation of a polyfunctional amine and a polyfunctional acid halide, an organic-inorganic hybrid functional layer or the like is favorably used. These separation functional layers can be formed by polycondensation of monomers on the porous supporting layer.

For example, the separation functional layer can contain a polyamide as a main component. Such a membrane can be formed by interfacial polycondensation of a polyfunctional amine and a polyfunctional acid halide by a known method. For example, an aqueous polyfunctional amine solution is applied onto the porous supporting layer, the excessive aqueous polyfunctional amine solution is removed with an air knife, and thereafter an organic solvent solution containing the polyfunctional acid halide is applied thereon to initiate polycondensation, thereby obtaining the polyamide separation functional layer.

<Porous Supporting Layer>

The porous supporting layer is a layer which supports the separation functional layer, and can also be restated as a porous resin layer when the material thereof is a resin.

The material used in the porous supporting layer and the shape thereof are not particularly limited. For example, the porous supporting layer may be formed with a porous resin on the substrate. As the porous supporting layer, polysulfone, cellulose acetate, polyvinyl chloride, epoxy resin, or a mixture or a laminate thereof is used. Among them, it is preferred to use polysulfone which has high chemical, mechanical and thermal stability and is easily controllable in pore size.

The porous supporting layer can be formed, for example, by casting a N,N-dimethylformamide solution of polysulfone in a constant thickness onto a substrate described later, such as a densely woven polyester nonwoven fabric, and subjecting it to wet coagulation in water.

The porous supporting layer can be formed in accordance with the method described in "Office of Saline Water Research and Development Progress Report", No. 359 (1968). In order to obtain a desired configuration, the polymer concentration, the solvent temperature and the poor solvent are adjustable.

<Substrate>

The separation membrane 3 may have the substrate from the viewpoints of the strength and dimensional stability of the separation membrane 3. As the substrate, a fibrous substrate is preferably used in terms of strength and fluid permeability.

As the substrate, a long-fiber nonwoven fabric and a short-fiber nonwoven fabric can be preferably used.

(3) Separation Membrane Pair

The separation membrane forms a separation membrane pair with the feed-side channel material and the permeate-side channel material. The separation membrane(s) is/are arranged such that feed-side faces face each other via the feed-side channel material interposed therebetween. In addition, the permeate-side channel material is arranged between permeate-side faces. In the permeate-side flow channel, the space between the permeate-side faces is opened only on one side lying inside in a winding direction and the other three sides are sealed (closed), such that the permeated fluid flows into the perforated central tube.

The separation membrane pair has a rectangular shape. The length of the separation membrane pair in the winding direction and the length (width) of the separation membrane pair in the longitudinal direction of the perforated central tube are not particularly limited. The greater the ratio of the length L to the width W of the separation membrane pair, the higher the flow velocity when the fluid passes through the separation membrane pair, so that it is preferable from the viewpoint of preventing concentration polarization. On the other hand, when the ratio of the length L to the width W of the separation membrane pair is too large, the pressure loss increases. From the balance between the concentration polarization and the pressure loss, in order to maintain the separation membrane element performance even in a high recovery ratio operation, the ratio L/W of the length L to the width W of the separation membrane pair is preferably from 2.5 to 8. More preferably from 4 to 6.

(4) Feed-Side Channel Material

The feed-side channel material 4 is arranged so as to be sandwiched between the feed-side faces of the separation membrane(s) 3 and forms a flow channel (that is, the feed-side flow channel) for feeding the feed fluids 101 and 104 to the separation membrane(s) 3. Further, in order to prevent the concentration polarization of the feed fluids 101 and 104, it is preferable that the feed-side channel material 4 has a shape so as to disturb the flow of the feed fluids 101 and 104.

The feed-side channel material 4 may be a member having a continuous shape such as a film, a net, or a sheet having a void and having a convex member provided on the sheet, or may be a member having a discontinuous shape indicating a projected area ratio larger than 0 and smaller than 1 with respect to the separation membrane 3. In addition, the feed-side channel material 4 may be separable from the separation membrane 3 or may be fixed to the separation membrane 3.

The material of the feed-side channel material 4 is not particularly limited, and may be a material same as or a material different from that of the separation membrane 3.

In the feed-side flow channel, it is important to stably form the flow channel, and it is also important to reduce the pressure loss since the flowing fluid in feed-side flow channel is more than in the permeate-side flow channel. Therefore, the projected area ratio of the feed-side channel material 4 is preferably from 0.03 to 0.8, more preferably from 0.05 to 0.5, and still more preferably from 0.08 to 0.35.

The projected area ratio of the feed-side channel material 4 with respect to the separation membrane 3 can be calculated by analyzing an image of the feed-side channel material 4 taken by a microscope or the like from a direction perpendicular to the membrane surface.

When the thickness of the feed-side channel material 4 is large, the pressure loss decreases, but when the element is formed with such a feed-side channel material 4, the membrane area that can be filled in the vessel is reduced. When the thickness thereof is small, since the pressure loss in the flow channel is large, the separation performance and the fluid permeation performance deteriorate. Therefore, for example, when the fluid is water, the fresh water generation performance of the element decreases, and the operation cost for increasing the fresh water production rate increases. Therefore, considering the balance between the above performances and operation cost, the thickness of the feed-side channel material 4 may be from 80 μm to 2000 μm, and preferably from 200 μm to 1000 μm.

The thickness of the feed-side channel material 4 can be directly measured with a commercially available thickness measuring instrument, or can be measured by analyzing an image taken with a microscope.

When the feed-side channel material 4 is a net, the net is constituted by a plurality of yarns. The plurality of yarns intersect with each other at intersections, and the intersection portions have the largest thickness.

The diameters of the yarns constituting the net may be constant in a length direction of the yarns, or may be uniformly increased or decreased in the length direction, or may be a form in which the increase and decrease in diameter are repeated. When the diameters of the yarns are repeatedly increased and decreased in the length direction, it is preferable that a plurality of yarns intersect with each other at a position where the diameter of the yarn is the largest. By intersecting a plurality of yarns at the point where the diameter of the yarn is the largest, the pressure loss in the feed-side flow channel can be reduced.

In addition, the diameters of the intersecting yarns may be the same or different. When the diameters of the intersecting yarns are different, if the thickness is constant, the yarn with a small diameter has a large pressure loss reduction effect, and the yarn with a large diameter has a large turbulence effect disturbing the flow.

From the balance between the pressure loss and the turbulence effect, as for the diameter of the cross section of the yarn constituting the net, the ratio of (the diameter of the smallest part)/(the diameter of the largest part) is preferably from 0.1 to 0.7, and more preferably from 0.3 to 0.6.

If the inclination angle of the yarns constituting the net is parallel to the flowing direction of the feed fluid, the pressure loss can be lowered but the concentration polarization reduction effect decreases; whereas if the inclination angle thereof is perpendicular to the flowing direction of the feed fluid, the pressure loss increases but the concentration polarization reduction effect can be increased. From the balance between the pressure loss and the concentration polarization reduction effect, the inclination angle of the yarns is preferably from −60° to 60° with respect to an average flow angle of the feed fluid. Here, the average flow angle is the average value of the flow angles in one separation membrane pair.

The larger the interval between the intersections at which a plurality of yarns intersect with each other, the smaller the pressure loss. When the interval is small, the pressure loss is increased. From the balance between above, the intersection interval is preferably from 1.0 mm to 10 mm, more preferably from 1.1 mm to 8 mm, and still more preferably from 1.2 mm to 5 mm.

The cross sectional shape of the yarn constituting the net is not particularly limited, and an ellipse, a circle, a triangle, a square, an irregular shape, or the like can be used. It is preferable that the area of the portion where the net and the separating membrane surface are in contact is small, since deterioration of the separation membrane performance due to rubbing between the separating membrane surface and the net can be prevented, the flow dead zone can be reduced, and the concentration polarization can be prevented. The projected area ratio of the portion where the net and the separating membrane surface are in contact with respect to the separation membrane is preferably from 0.01 to 0.25, and more preferably from 0.02 to 0.2.

The material of the yarn constituting the net is not particularly limited as long as it can maintain the rigidity as the feed-side channel material and does not damage the surface of the separation membrane. The material may be the same as or be different from that of the separation membrane, and a polyethylene, a polypropylene, a polylactic acid, an ethylene vinyl acetate copolymer, a polyester, polyurethane, and a thermosetting elastomer may be preferably used.

As described later, the separation membrane element according to the present invention includes a first separation membrane pair and a second separation membrane pair. A feed-side channel material used in the first separation membrane pair and a feed-side channel material used in the second separation membrane pair may be different from each other. Since the flow direction, the flow rate, and the quality of the fluid to be fed are different between the first separation membrane pair and the second separation membrane pair, it is preferable to choose a feed-side channel material suitable for each separation membrane pair from the viewpoint of improving the performance of the separation membrane element.

(5) Feed-Side Flow Channel

<Flow>

A fluid to be fed to one separation membrane element 1 and a fluid discharged from the feed-side flow channel of the separation membrane element 1 are respectively referred to as a feed fluid 101 and a concentrated fluid 103 for convenience. In the embodiment of the separation membrane element according to the present invention, since the concentrated fluid of one separation membrane pair serves as a feed fluid of another separation membrane pair, a fluid during this process is referred to as an intermediate fluid 104.

Figure 2:
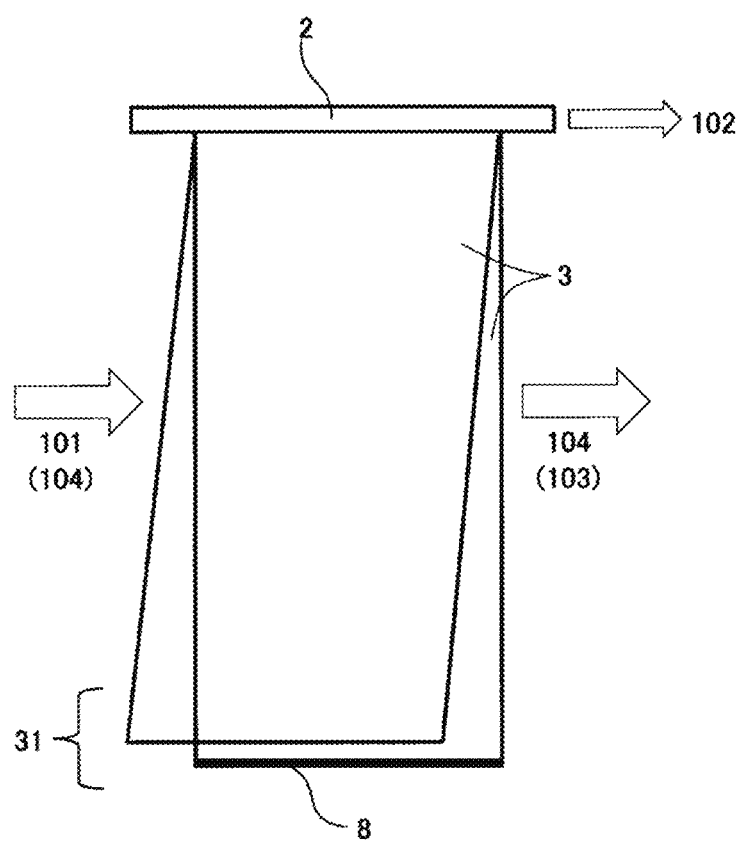
FIG. 2 is an example of a developed view of the separation membrane element according to the present invention.
Figure 3:
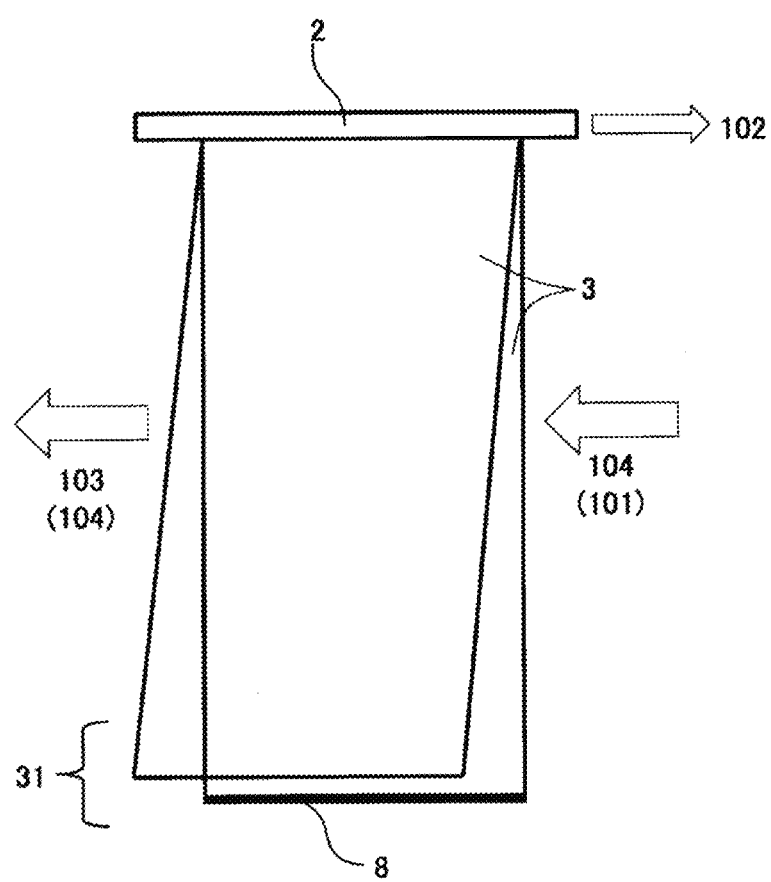
FIG. 3 is an example of a developed view of the separation membrane element according to the present invention.
Figure 4:
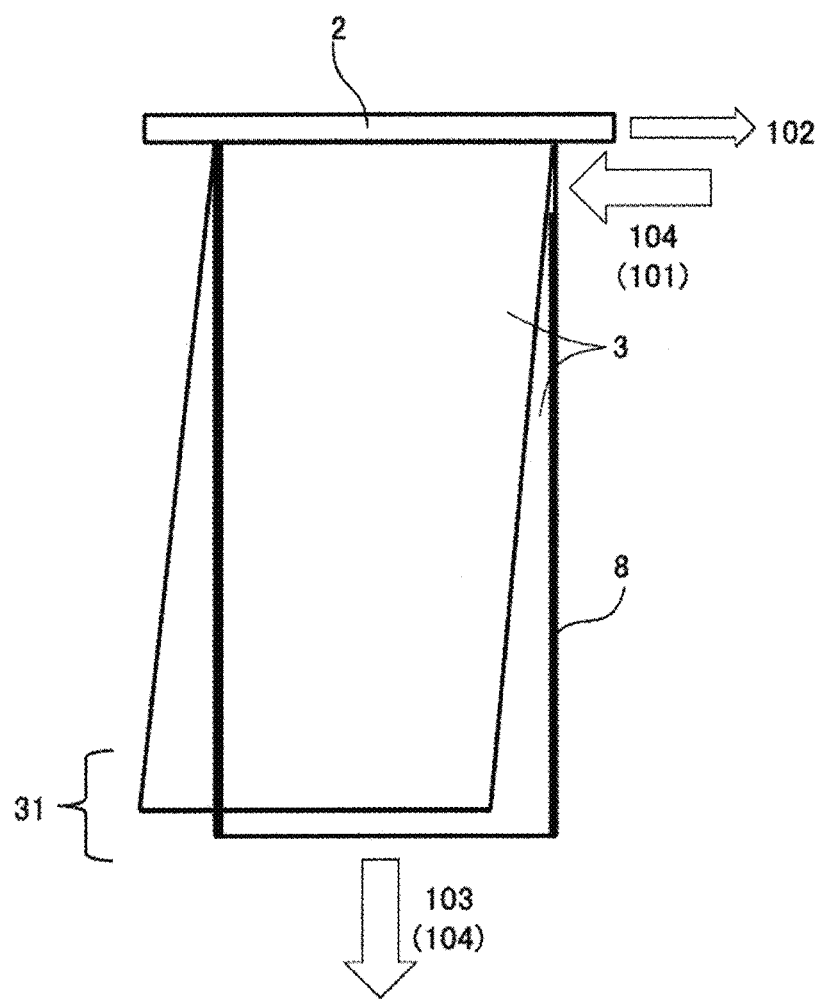
FIG. 4 is an example of a developed view of the separation membrane element according to the present invention.
Figure 5:
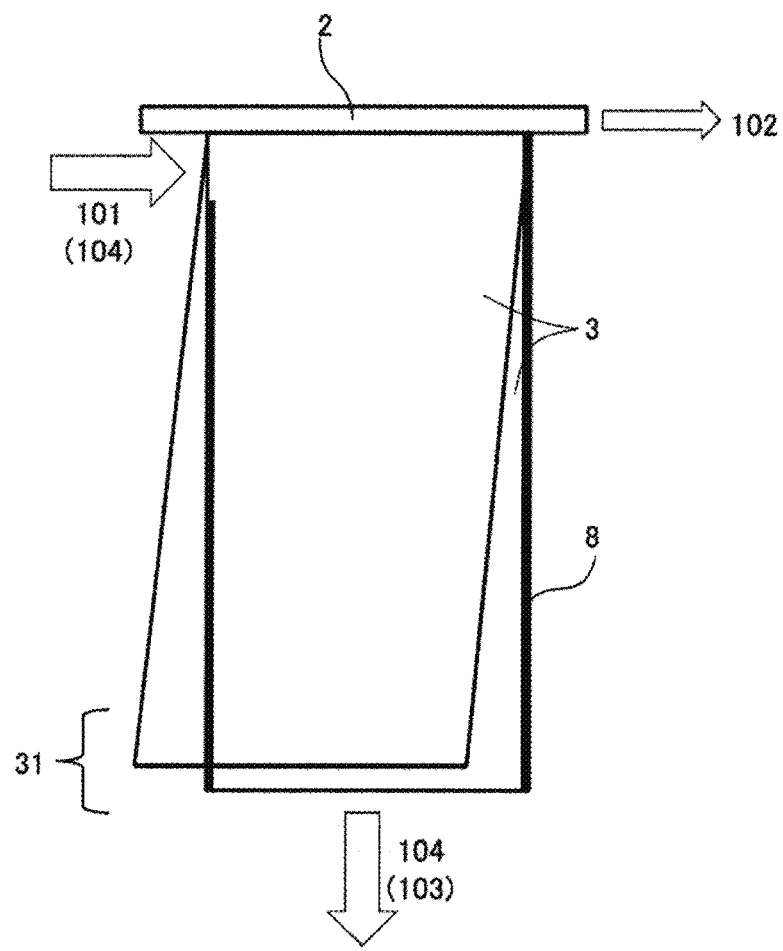
FIG. 5 is an example of a developed view of the separation membrane element according to the present invention.
Figure 6:
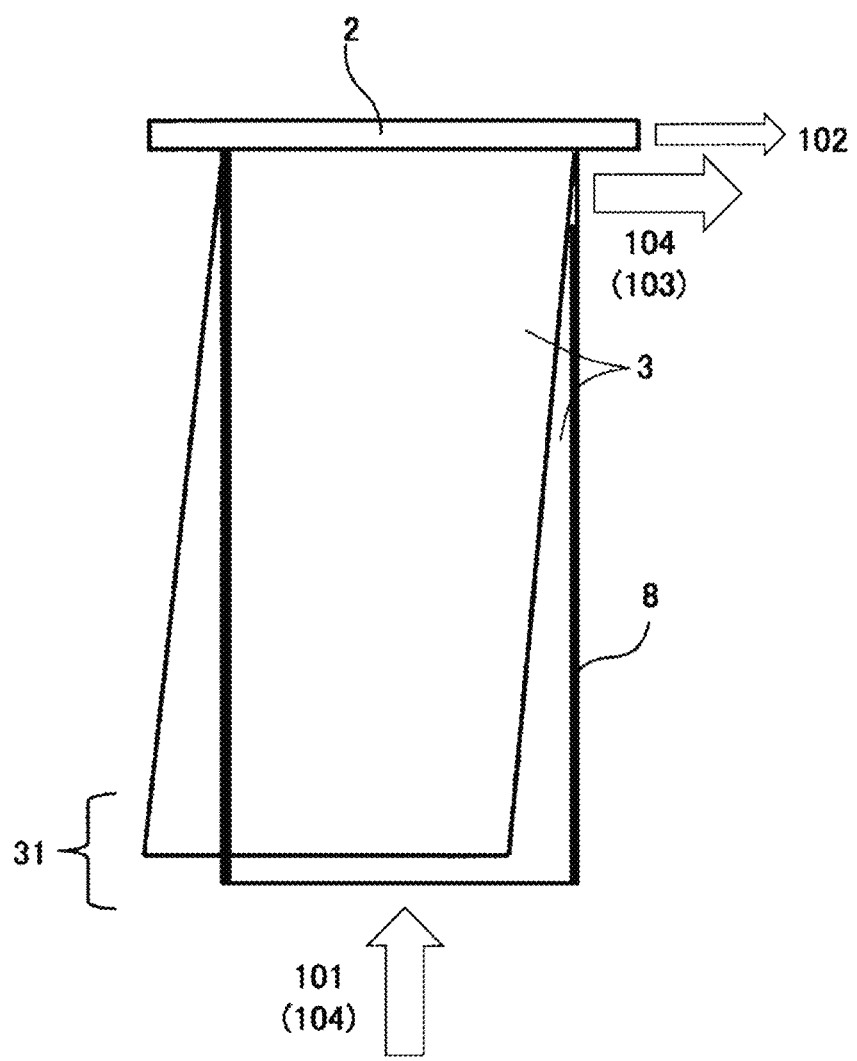
FIG. 6 is an example of a developed view of the separation membrane element according to the present invention.
Figure 7:
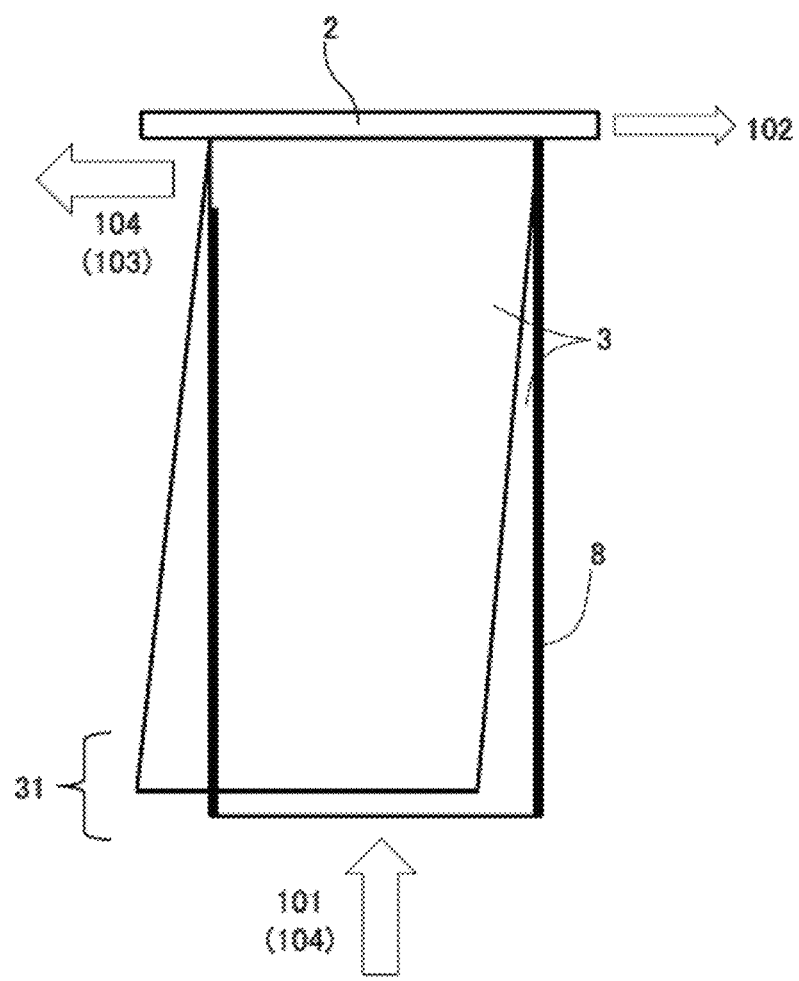
FIG. 7 is an example of a developed view of the separation membrane element according to the present invention.

FIG. 2 to FIG. 7 show developed views of the separation membrane element 1. FIG. 2 to FIG. 7 show states of the perforated central tube 2 and the separation membrane pair 31 before being wound around the perforated central tube 2. In FIG. 2 and FIG. 3, a feed fluid or an intermediate fluid (101, 104) is fed from one end face of the separation membrane pair, and an intermediate fluid or a concentrated fluid (104, 103) is discharged from the other end face. In FIG. 4 and FIG. 5, the feed fluid or the intermediate fluid (101, 104) is fed from one end face of the separation membrane pair, and the intermediate fluid or the concentrated fluid (104, 103) is discharged from an outer peripheral end of the separation membrane pair. In FIG. 6 and FIG. 7, the feed fluid or the intermediate fluid (101, 104) is fed from the outer peripheral end of the separation membrane pair, and the intermediate fluid or the concentrated fluid (104, 103) is discharged from one end face.

<I-Type Separation Membrane Pair>

The separation membrane pairs having developed views shown in FIG. 2 and FIG. 3 are hereinafter referred to as I-type separation membrane pairs.

In the I-type separation membrane pair, an end face from which the feed fluid or intermediate fluid is fed to the separation membrane pair is called an inflow end face, and an end face from which the concentrated fluid or intermediate fluid is discharged is called a discharge end face.

In the separation membrane element according to the present invention, a flow channel closing ratio on the discharge end face in the I-type separation membrane pair is preferably from 0% to 95%. When the flow channel closing ratio on the discharge end face of the feed fluid is 0%, the pressure loss of the flow channel of the feed fluid can be reduced and the entire membrane surface can be effectively utilized. Thus, the permeated fluid amount can be increased. When the flow channel closing ratio is more than 0%, the flow channel of the feed fluid narrows at the discharge end face, whereby the membrane surface linear velocity of the feed fluid can be kept large and the concentration polarization can be prevented particularly in a high recovery ratio operation. Therefore, in view of the target performance of the entire separation membrane element according to the present invention, it is preferable to appropriately design the flow channel closing ratio.

In a case where the flow channel closing ratio on the discharge end face is more than 0%, when a direction perpendicular to the longitudinal direction of the perforated central tube is taken as the winding direction, a flow channel closed portion may be continuously closed from the outermost periphery to the inner periphery in the winding direction, or may be continuously closed from the innermost periphery to the outer periphery, or may be closed intermittently in the winding direction. In the case of intermittently closing in the winding direction, the length of one site in the closed portion is preferably from 1 mm to 100 mm and more preferably from 3 mm to 10 mm. The length of one site in an opened portion is preferably from 1 mm to 100 mm, and more preferably from 3 mm to 10 mm.

The length of one site in the closed portion may be constant or may vary from the inside to the outside in the winding direction. In addition, the length of one site in the opened portion may also be constant, may gradually widen, or gradually narrow from the inside to the outside in the winding direction.

Further, it is preferable that the flow channel closing ratio on the inflow end face is from 0% to 90%. When the flow channel closing ratio on the inflow end face is 0%, the pressure loss of the flow channel of the feed fluid can be reduced and the entire membrane surface can be effectively utilized. Thus, the permeated fluid amount can be increased. When the flow channel closing ratio is more than 0%, the membrane surface linear velocity of the feed fluid can be increased, and the concentration polarization can be prevented.

The flow channel closed portion of the inflow end face may be continuously sealed from the innermost periphery to the outer periphery in the winding direction or may be intermittently sealed in the winding direction.

In the case of intermittently sealing in the winding direction, the length of one site in the closed portion is preferably from 1 mm to 100 mm, and more preferably from 3 mm to 100 mm. The length of one site in an opened portion is preferably from 1 mm to 100 mm, and more preferably from 3 mm to 10 mm.

When the flow channel closed portion of the discharge end face is continuously sealed from the outermost periphery to the inner periphery in the winding direction, it is preferable that the flow channel closed portion of the inflow end face is continuously sealed from the innermost periphery to the outer periphery in the winding direction. It is preferable to use such a closed portion, since the entire membrane surface can be effectively utilized.

Similarly, when the flow channel closed portion of the discharge end face is continuously sealed from the innermost periphery to the outer periphery in the winding direction, it is preferable that the flow channel closed portion of the inflow end face is continuously sealed from the outermost periphery to the inner periphery in the winding direction. It is preferable to use such a closed portion, since the entire membrane surface can be effectively utilized.

In addition, since the flow rate is smaller at the discharge end face than at the inflow end face, regarding the flow channel closing ratios on the discharge end face and on the inflow end face, it is preferable that the flow channel closing ratio on the discharge end face is higher than that on the inflow end face.

In the I-type separation membrane pair, the flow channel closing ratios on the inner peripheral end and the outer peripheral end of the separation membrane pair are 100%. Regarding the inner peripheral end and the outer peripheral end of the separation membrane pair, the flow channel is closed by folding the separation membrane or sealing the separation membrane with an adhesive. When the inner peripheral end is formed by folding, the outer peripheral end can be closed by sealing with an adhesive; when the outer peripheral end is formed by folding, the inner peripheral end can be closed by sealing with an adhesive. In addition, the flow channel can be closed by sealing both the inner peripheral end and the outer peripheral end with an adhesive.

<Reverse L-Type Separation Membrane Pair>

In addition, the separation membrane pairs having developed views shown in FIG. 4 and FIG. 5 are hereinafter referred to as reverse L-type separation membrane pairs.

In the reverse L-type separation membrane pair, the end face from which the feed fluid or intermediate fluid is fed to the separation membrane pair is called an inflow end face, and the outer peripheral end of the separation membrane pair from which the intermediate fluid or concentrated fluid is discharged is called a discharge end.

In the reverse L-type separation membrane pair, the closing ratio is 100% on an end face opposite to the inflow end face.

On the other hand, it is preferable that the flow channel closing ratio on the inflow end face is from 0% to 95%. When the flow channel closing ratio is more than 0%, it is preferable that the flow channel closed site is continuous from the outside to the inside in the winding direction.

It is preferable that the flow channel closing ratio on the discharge end is from 0% to 95%. When the flow channel closing ratio is more than 0%, it is preferable that the flow channel closed site is continuous from the inflow end face side toward the longitudinal direction of the perforated central tube.

When the flow channel closing ratios on the inflow end face and the discharge end are within the above ranges, the short path of the flow channel of the feed fluid can be prevented and a sufficient permeated fluid amount can be obtained.

The flow channel closing ratio on the inner peripheral end of the separation membrane pair is 100%, and the flow channel can be closed by folding the separation membrane or sealing the separation membrane with an adhesive.

<L-Type Separation Membrane Pair>

In addition, the separation membrane pairs having developed views shown in FIG. 6 and FIG. 7 are hereinafter referred to as L-type separation membrane pairs.

In the L-type separation membrane pair, the outer peripheral end of the separation membrane pair from which the feed fluid or intermediate fluid is fed to the separation membrane pair is called an inflow end, and the end face from which the intermediate fluid or concentrated fluid is discharged is called a discharge end face.

In the L-type separation membrane pair, the closing ratio is 100% on an end face opposite to the discharge end face.

It is preferable that the flow channel closing ratio on the inflow end is from 0% to 95%. When the flow channel closing ratio is more than 0%, it is preferable that the flow channel closed site is continuous from the discharge end face side toward the longitudinal direction of the perforated central tube.

It is preferable that the flow channel closing ratio on the discharge end face is from 0% to 95%. When the flow channel closing ratio is more than 0%, it is preferable that the flow channel closed site is continuous from the outside to the inside in the winding direction.

When the flow channel closing ratios on the inflow end and the discharge end face are within the above ranges, the short path of the flow channel of the feed fluid can be prevented and a sufficient permeated fluid amount can be obtained.

The flow channel closing ratio on the inner peripheral end of the separation membrane pair is 100%, and the flow channel can be closed by folding the separation membrane or sealing the separation membrane with an adhesive.

<I-Type—Reverse L-Type Element>

In one embodiment of the separation membrane element according to the present invention, an I-type separation membrane pair and a reverse L-type separation membrane pair are present together in one separation membrane element.

Figure 8:
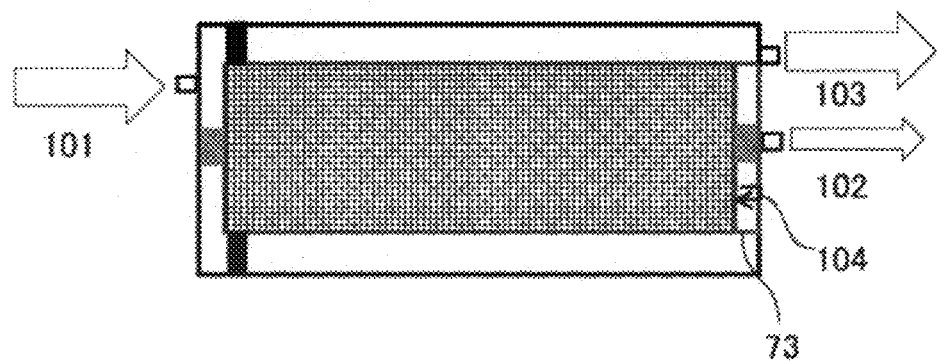
FIG. 8 is an example of a cross sectional view of a separation membrane element and a vessel for a separation membrane element according to the present invention.
Figure 9:
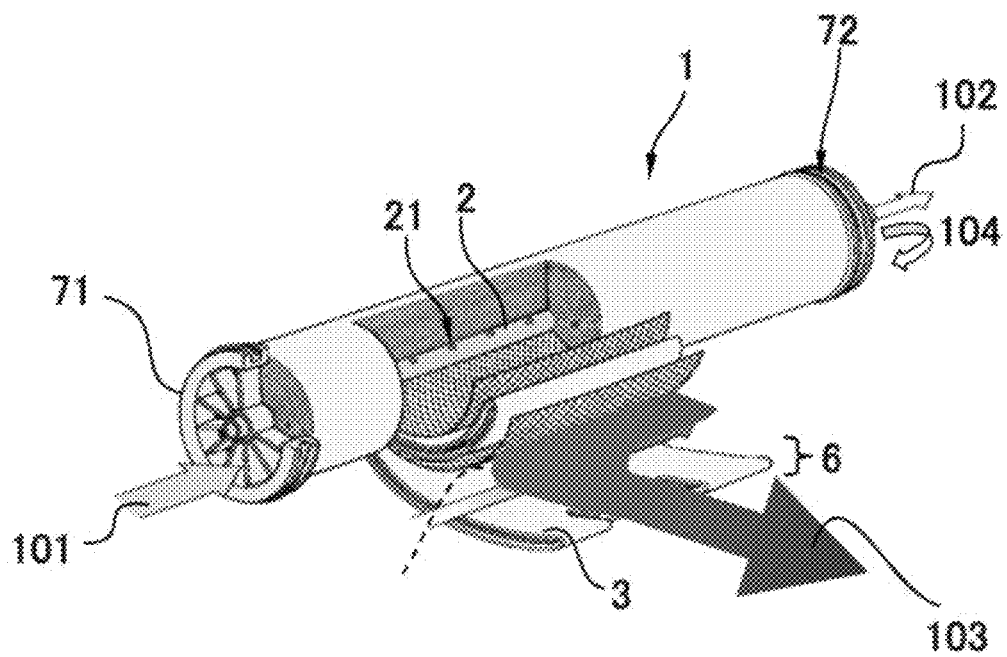
FIG. 9 is an example of an exploded perspective view of a separation membrane element according to the present invention.
Figure 10:
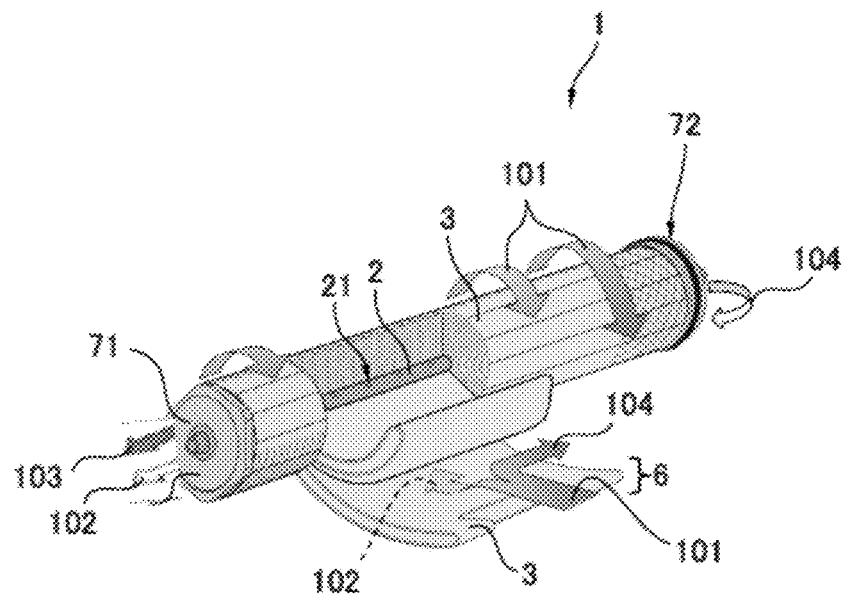
FIG. 10 is an example of an exploded perspective view of a separation membrane element according to the present invention.
Figure 11:
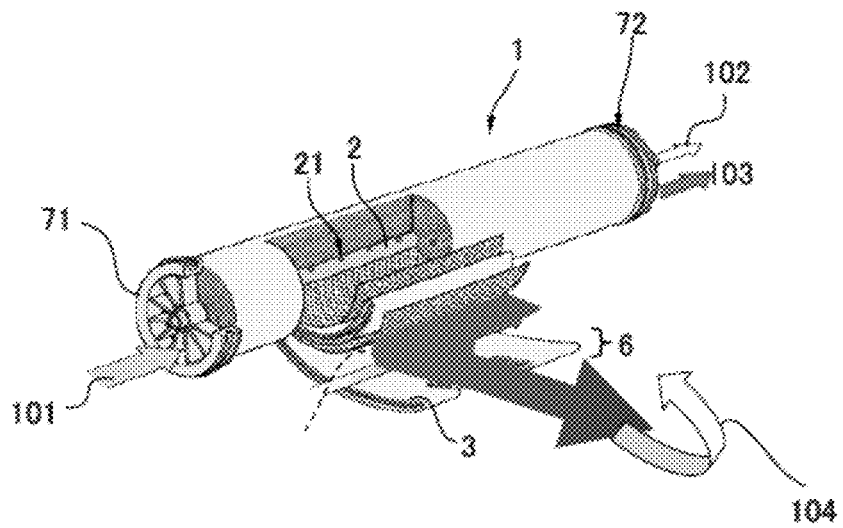
FIG. 11 is an example of an exploded perspective view of a separation membrane element according to the present invention.
Figure 12:
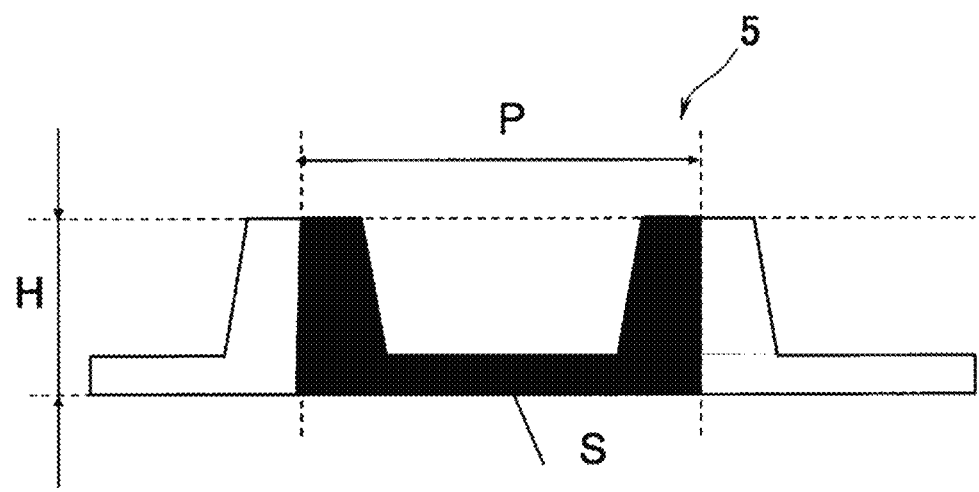
FIG. 12 is an example of a cross sectional view of a permeate-side channel material applied to the present invention.

When the I-type separation membrane pair and the reverse L-type separation membrane pair are present together, the feed fluid is fed from one end face of the I-type separation membrane pair (101) and discharged to the other end face of the I-type separation membrane pair (104). As shown in FIG. 8, the discharged fluid 104 makes a U-turn by a cap or a sealed vessel to be described later, is fed from one end face of the reverse L-type separation membrane pair (104), and is discharged from the outer peripheral end of the reverse L-type separation membrane pair (103). That is, the concentrated fluid of the I-type separation membrane pair serves as the feed fluid of the reverse L-type separation membrane pair. Therefore, the sum of the flow amounts of the fluids fed to the separation membrane pairs is larger than the total flow amount of the fluids fed to the wound body. With such a structure, even when the separation membrane element as a whole is operated at a high recovery ratio, the recovery ratio of each separation membrane pair can be lowered. Thus, the performance deterioration of the separation membrane element can be prevented even when a high recovery ratio operation is performed.

As for ratio of the number of the I-type separation membrane pair to the number of the reverse L-type separation membrane pair, the higher the ratio of the reverse L-type separation membrane pair, the lower the recovery ratio of the I-type separation membrane pair, and for example, the concentration of the raw water to be fed to the reverse L-type separation membrane pair can be controlled to be low. On the other hand, when the ratio of the reverse L-type separation membrane pair is low, the flow amount fed to one reverse L-type separation membrane pair increases, leading to increase in the effect of preventing concentration polarization. From the balance between above, the proportion of the number of the I-type separation membrane pair to the total number of the separation membrane pairs is preferably from 55% to 90%, and more preferably from 60% to 80%. That is, the proportion of the number of the reverse L-type separation membrane pair to the total number of the separation membrane pairs is preferably from 10% to 45% and more preferably from 20% to 40%.

<L-Type—I-Type Element>

In addition, in one embodiment of the separation membrane element according to the present invention, an I-type separation membrane pair and an L-type separation membrane pair are present together in one separation membrane element.

When the I-type separation membrane pair and the L-type separation membrane pair are present together, the feed fluid is fed from the outer peripheral end of the L-type separation membrane pair (101) and discharged to one end face of the L-type separation membrane pair (104). As shown in FIG. 8, the discharged fluid 104 makes a U-turn by a cap or a sealed vessel to be described later, is fed from one end face of the I-type separation membrane pair (104), and is discharged from the other end face of the I-type separation membrane pair (103). That is, the concentrated fluid of the L-type separation membrane pair serves as the feed fluid of the I-type separation membrane pair. Therefore, the sum of the flow amounts of the fluids fed to the separation membrane pairs is larger than the total flow amount of the fluids fed to the wound body. With such a structure, even when the separation membrane element as a whole is operated at a high recovery ratio, the recovery ratio of each separation membrane pair can be lowered. Thus, the performance deterioration of the separation membrane element can be prevented even when a high recovery ratio operation is performed.

As for ratio of the number of the I-type separation membrane pair to the number of the L-type separation membrane pair, the higher the ratio of the I-type separation membrane pair, the lower the recovery ratio of the L-type separation membrane pair, and for example, the concentration of the raw water to be fed to the I-type separation membrane pair can be controlled to be low. On the other hand, when the ratio of the I-type separation membrane pair is low, the flow amount fed to one I-type separation membrane pair increases, leading to increase in the effect of preventing concentration polarization. From the balance between above, the proportion of the number of the I-type separation membrane pair to the total number of the separation membrane pairs is preferably from 10% to 45%, and more preferably from 20% to 40%. That is, the proportion of the number of the L-type separation membrane pair to the total number of the separation membrane pairs is preferably from 55% to 90%, and more preferably from 60% to 80%.

<Reverse L-Type—L-Type Element>

In one embodiment of the separation membrane element according to the present invention, an L-type separation membrane pair and a reverse L-type separation membrane pair are present together in one separation membrane element.

When the L-type separation membrane pair and the reverse L-type separation membrane pair are present together, the feed fluid is fed from one end face of the reverse L-type separation membrane pair (101) and discharged to the outer peripheral end of the reverse L-type separation membrane pair (104). The discharged fluid 104 makes a U-turn by a sealed vessel or seal member, is fed to the outer peripheral end of the L-type separation membrane pair (104), and is discharged to one end face of the L-type separation membrane pair (103). That is, the concentrated fluid of the reverse L-type separation membrane pair serves as the feed fluid of the L-type separation membrane pair. Therefore, the sum of the flow amounts of the fluids fed to the separation membrane pairs is larger than the total flow amount of the fluids fed to the wound body. With such a structure, even when the separation membrane element as a whole is operated at a high recovery ratio, the recovery ratio of each separation membrane pair can be lowered. Thus, the performance deterioration of the separation membrane element can be prevented even when a high recovery ratio operation is performed.

As for ratio of the number of the L-type separation membrane pair to the number of the reverse L-type separation membrane pair, the higher the ratio of the L-type separation membrane pair, the lower the recovery ratio of the reverse I-type separation membrane pair, and for example, the concentration of the raw water to be fed to the L-type separation membrane pair can be controlled to be low. On the other hand, when the ratio of the L-type separation membrane pair is low, the flow amount fed to one L-type separation membrane pair increases, leading to increase in the effect of preventing concentration polarization. From the balance between above, the proportion of the number of the reverse L-type separation membrane pair to the total number of the separation membrane pairs is preferably from 55% to 90%, and more preferably from 60% to 80%. That is, the proportion of the number of the L-type separation membrane pair to the total number of the separation membrane pairs is preferably from 10% to 45%, and more preferably from 20% to 40%.

<Sealing>

The flow channels on one end face and the other end face of the separation membrane pair can be closed by sealing the end face with an adhesive before winding, by sealing the end face with an adhesive after winding, or by fitting a cap or a telescope prevention plate having a sealing portion on the end face.

The flow channel on the outer peripheral end of the separation membrane pair can be closed by folding the separation membrane, by sealing the outer peripheral end with an adhesive or tape before winding, or by sealing the outer peripheral end with an adhesive or tape after winding.

The flow channel on the inner peripheral end of the separation membrane pair can be closed by folding the separation membrane or by sealing the inner peripheral end with an adhesive or tape before winding.

The sealing can be performed by adhesion with an adhesive, a hot melt or the like, by fusion with heat or laser, or the like. It is preferable that the adhesive to be used in the sealing has a viscosity in a range of from 4 Pa·s to 15 Pa·s, and more preferably from 5 Pa·s to 12 Pa·s. When wrinkles are generated in the separation membrane 3, the performance of the separation membrane element 1 may deteriorate. However, by making the viscosity of the adhesive 15 Pa·s or less, wrinkles are less apt to occur when the separation membrane 3 is wound around the perforated central tube 2. When the viscosity of the adhesive is 4 Pa·s or more, the outflow of the adhesive from between the separation membranes is prevented and the risk that the adhesive is attached to the unnecessary portion is reduced.

The amount of the adhesive to be applied is preferably such an amount that the width of a part to which the adhesive is applied is from 2 mm to 30 mm, after the separation membranes 3 have been wound around the perforated central tube 2. Thereby, the effective membrane area can be relatively largely secured.

The adhesive is preferably a urethane adhesive or a silicone adhesive. In the case of a urethane adhesive, in order to set the viscosity of the urethane adhesive to a range of from 40 Pa·s to 150 Pa·s, it is preferable that an isocyanate as a main ingredient and a polyol as a curing agent are mixed in a ratio of isocyanate:polyol of from 1:1 to 1:5. The viscosity of the adhesive is obtained by measuring the viscosity of a mixture in which the main ingredient, the single curing agent and the blending ratio thereof are previously defined, with a B-type viscometer (JIS K 6833).

The sealing with a cap is performed by fitting a cap formed in a predetermined shape in advance to the end of the wound body of the separation membrane element. At this time, it is necessary to prevent a gap from being generated between the end of the wound body of the separation membrane element and a flow channel sealing portion of the cap. A telescope prevention plate can be used as a cap as long as it has a structure in which no gap is generated between the end of the wound body of the separation membrane element and the flow channel sealing portion of the cap and sealing of the end on the feed side can be performed.

Figure 13A:
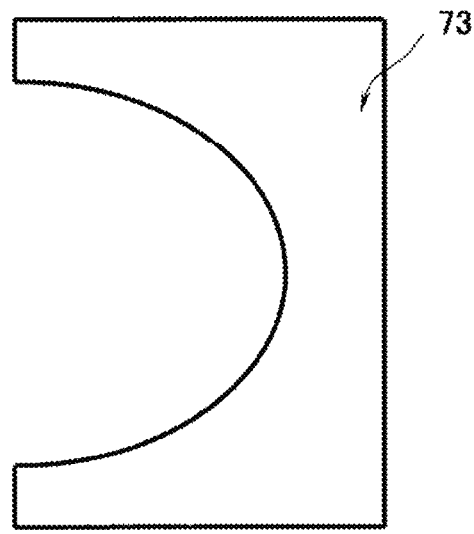
FIGS. 13(a) and 13(b) are examples of a cross sectional view of a cap applied to the present invention.
Figure 13B:
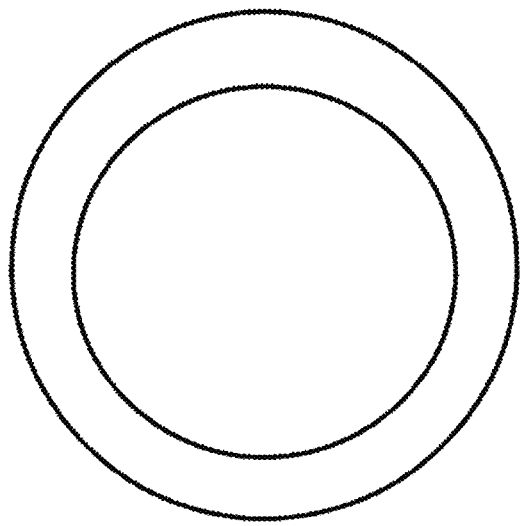

In addition, the cap used when the intermediate fluid makes a U-turn at the end face of the wound body may be integrated with the above-described cap for closing the flow channel. The cap used for U-turn is fitted onto the end face of the wound body so as to secure a flow channel for feeding the intermediate fluid discharged from the one end face to another one end face. The shape of the cap used for U-turn is not particularly limited, but it is preferable that the flow channel has a rounded shape in the viewpoint of preventing the pressure loss during U-turn as shown in FIGS. 13(*a*) and 13(*b*).

The material of the cap is not particularly limited as long as it can be formed into a predetermined shape and has strength capable of securing the flow channel for the intermediate fluid, and is preferably a resin from the viewpoints of ease of molding, strength and cost. From the above viewpoints, ABS, polyvinyl chloride, polyethylene, polypropylene are preferably used as the material of the resin.

In the I-type—reverse L-type element and the L-type—I-type element, it is preferable that the outermost periphery of the element is covered with a net, a porous film or the like in order to secure the flow channel for the feed fluid or the concentrated fluid and to maintain the diameter of the wound body. On the other hand, in the reverse L-type—L-type element, it is also preferable that the outermost periphery of the element is covered with a net or a porous film in the case of making a U-turn with a vessel. A U-turn can be made within the separation membrane element by using a feed-side channel material longer than the separation membrane pair. In this case, it is preferable that the outermost periphery of the element is covered with a water impermeable sheet. The water impermeable sheet is not particularly limited as long as it is a sheet that does not permeate water, and a film is preferably used from the viewpoint of thickness and manufacturability.

In the embodiments of the separation membrane element according to the present invention, portions from which the feed fluid is fed are three portions which are one end face, the other end face, and the outer peripheral end of the separation membrane pair. However, a combination of separation membrane pairs of more various patterns can be obtained by using a separation membrane element having a structure capable of feeding or discharging the feed fluid from the inner peripheral end of the separation membrane pair, for example, by providing a second perforated central tube capable of feeding or discharging the feed fluid.

(6) Permeate-Side Channel Material

The permeate-side channel material 5 is arranged so as to be sandwiched between the permeate-side faces of the separation membranes 3, and functions to form a permeate-side flow channel for leading the fluid having passed through the separation membrane 3 to the pores 21 of the perforated central tube 2.

From the viewpoints that the flow resistance of the permeate-side flow channel is reduced, the separation membrane 3 is prevented from sinking into the flow channel of the permeated fluid even under pressure filtration, and the flow channel is stable formed, the cross sectional area ratio of the permeate-side channel material 5 is preferably from 0.3 to 0.75, and more preferably from 0.4 to 0.6. The type of the permeate-side channel material is not limited, and a weft knitted fabric in which the thickness of the conventional tricot is increased so that the flow channel is expanded, a weft knitted fabric in which the basis weight of the fiber is reduced, a sheet in which the protrusions are arranged on a porous sheet such as a nonwoven fabric, an unevenness-processed sheet obtained by unevenness-processing a film or nonwoven fabric, or the like can be used.

When the permeate-side channel material having a specific cross sectional area ratio is arranged in the separation membrane element according to the present invention, the flow resistance of the permeate-side flow channel can be further reduced, and in addition, when the separation membrane element is operated at the same recovery ratio as the separation membrane element including a channel material having a high flow resistance, the flow velocity of the feed fluid increases and the concentration polarization can be reduced, and the increase of the concentration polarization and the occurrence of the scale can be further prevented particularly under a high recovery ratio operation.

Generally, the separation membrane element is operated at a recovery ratio of 30% or less, while the separation membrane element according to the present invention can be stably operated even at a recovery ratio of 35% or more. The higher the recovery ratio, the more superior can be developed with respect to the conventional separation membrane element.

When the thickness of the permeate-side channel material 5 is large, the pressure loss can be reduced, but the membrane area of the separation membrane element 1 that can be filled in the vessel decreases. When the thickness of the permeate-side channel material 5 is small, the membrane area of the separation membrane element 1 that can be filled increases, but the pressure loss increases. From the balance between above, the thickness of the permeate-side channel material 5 is preferably from 0.1 mm to 0.5 mm, and more preferably from 0.2 mm to 0.4 mm.

The thickness of the permeate-side channel material 5 can be directly measured by a commercially available thickness measuring instrument.

The material of the permeate-side channel material 5 may be any material as long as it can be easily wound around the perforated central tube 2, and the compressive elasticity modulus of the permeate-side channel material 5 is preferably from 0.1 GPa to 5 GPa. When the compressive elasticity modulus is within the above range, the permeate-side channel material 5 can be easily wound around the perforated central tube 2. Specifically, a polyester, a polyethylene, a polypropylene and the like are preferably used.

The compressive elasticity modulus of the permeate-side channel material 5 can be measured by performing a compression test using a precision universal testing machine and preparing a stress-strain curve.

A permeate-side channel material used in the first separation membrane pair and a permeate-side channel material used in the second separation membrane pair may be different from each other. Since the permeated fluid amount is different between the first separation membrane pair and the second separation membrane pair, it is preferable to choose a permeate-side channel material suitable for each separation membrane pair from the viewpoint of improving the performance of the separation membrane element.

(7) Perforated Central Tube

The perforated central tube 2 may be configured such that the permeated fluid flows therein, and the material and shape thereof are not particularly limited. When the diameter of the perforated central tube 2 is large, the membrane area of the separation membrane element 1 that can be filled is reduced; when the diameter of the perforated central tube is small, the flow resistance when the permeated fluid flows inside the perforated central tube 2 increases. The diameter of the perforated central tube 2 is appropriately designed according to the flow amount of the permeated fluid, and is preferably from 10 mm to 50 mm, and more preferably from 15 mm to 40 mm. As the perforated central tube 2, for example, a cylindrical member having a side surface provided with a plurality of pores is used.

(8) Water Treatment System

The separation membrane element described above can be configured as a fluid separation apparatus in combination with a pump for feeding a fluid to the separation membrane element, a device for pretreating the fluid, or the like. Such a fluid separation apparatus, for example, can be applied to an RO water purifier, a water treatment system for desalination of brackish water, and a water treatment system for seawater desalination. Only one separation membrane element described above may be loaded in one vessel, or a plurality of (about seven) separation membrane elements are connected in series and loaded in one vessel. When a plurality of separation membrane elements are connected in series, only a certain number of the plurality of separation membrane elements connected may be the separation membrane element described above.

When only one separation membrane element described above is loaded in one vessel, the gap between the separation membrane element and the vessel after the separation membrane element is loaded in the vessel is divided into four sections, i.e., the feed fluid 101, the permeated fluid 102, the concentrated fluid 103, and the intermediate fluid 104 by the brine seal or the form of the vessel. The performance of the separation membrane element can be exerted by not allowing the four fluids mix together.

In the case of performing division by the brine seal, it is possible to perform division by using two brine seals. In the case of performing division by the form of the vessel, for example, the division can be performed by using one end face side of a cylindrical vessel as a flow channel of the feed fluid, using a section of the innermost periphery on the other end face side as a flow channel of the permeated fluid, using a middle section as a flow channel of the intermediate fluid, and using a section of the outermost periphery as a flow channel of the concentrated fluid.

EXAMPLES

Hereinafter, the present invention is described in more detail with reference to examples, but the present invention is not limited to these examples.

(Cross Sectional Area Ratio of Permeate-Side Channel Material)

The permeate-side channel material loaded in the separation membrane element was cut along the direction parallel to the longitudinal direction of the perforated central tube in a manner of passing through a protruding portion of the permeate-side channel material. As for the cross section thereof, the distance between the center of one protruding portion and the center of another protruding portion adjacent thereto, and the thickness of the permeate-side channel material were measured using a high-precision configuration analysis system ("KS-1100" manufactured by KEYENCE CORPORATION), and a ratio of the product of the above distance and the thickness to the cross sectional area of the permeate-side channel material occupying between the center line of one protruding portion and the center line of another protruding portion adjacent thereto was calculated. The average value of ratios of 30 sites randomly selected was calculated as the cross sectional area ratio.

(Fresh Water Production Rate)

The separation membrane element was operated under conditions of an operation pressure of 0.41 MPa and a temperature of 25° C. for 60 minutes using a NaCl aqueous solution having a concentration of 200 ppm and a pH of 7.0 as feed water, then sampling was performed for 1 minute, and the fresh water production rate (L/min) was measured.

(Recovery Ratio)

In the measurement of the fresh water production rate, the ratio of the amount of water fed at a predetermined time to the amount of permeate was taken as the recovery ratio.

(Removal Ratio (TDS Removal Ratio))

For the feed water used in operation for 1 minute for measurement of the fresh water production rate and the sampled permeate, the TDS concentration was measured by electric conductivity measurement, and based on the following formula, the TDS removal ratio was calculated.

$$\text{TDS removal ratio (\%)}=100\times\{1-(\text{TDS concentration in permeate/TDS concentration in feed water})\}$$

Example 1

On a nonwoven fabric made of polyethylene terephthalate fibers (fiber diameter: 1 decitex, thickness: about 0.09 mm, density: 0.80 g/cm$^3$), a 15.2 mass % N,N-dimethylformamide solution of a polysulfone was cast to a thickness of 180 m at room temperature (25° C.). Immediately thereafter, the fabric was immersed in pure water, left therein for 5 minutes, and immersed in hot water at 80° C. for 1 minute to prepare a porous supporting layer (thickness: 0.13 mm) made of a fiber-reinforced polysulfone supporting layer.

Thereafter, a porous supporting layer roll was unwound and was immersed in a 3.8 mass % aqueous solution of m-PDA for 2 minutes, and the supporting layer was slowly drawn up in the vertical direction. Further, the excessive aqueous solution was removed from the surface of the supporting layer by spraying nitrogen from an air nozzle. Then, an n-decane solution containing 0.175 mass % of trimesic acid chloride was applied, so that the surface was completely wetted and left standing for 1 minute. Then, the membrane was drained by holding vertically for 1 minute to remove the excess solution from the membrane. Thereafter, the membrane was washed with hot water at 90° C. for 2 minutes to obtain a separation membrane roll.

The separation membrane thus obtained was cut into six pieces, each having a length 1.4 m and a width of 0.25 m and folded, and a net (thickness: 0.3 mm, pitch: 1.5 mm×1.5 mm) was disposed as a feed-side channel material in a manner that the inclination angle of the net constituent yarns was 45° with respect to the winding direction. Among the six pieces, four were used as I-type separation membrane pairs and two were used as reverse L-type separation membrane pairs. The I-type separation membrane pairs were folded such that the closing ratios on one end face and the other end face were 0%, the closing ratios on the inner peripheral end and the outer peripheral end were 100%, and then an adhesive was applied thereto. The reverse L-type separation membrane pairs were continuously coated with an adhesive from the outside to the inside in the winding direction such that the closing ratio on the other end face was 70%, and the closing ratio was 100% on one end face, 100% on the inner peripheral end, and 0% on the outer peripheral end.

Using an applicator loaded with a comb-shaped shim having a slit width of 0.5 mm and a pitch of 0.9 mm, composition pellets containing 60% by mass of highly crystalline PP (MFR: 1,000 g/10 min, melting point: 161° C.) and 40 mass % of a low crystalline α-olefinic polymer (manufactured by Idemitsu Kosan Co., Ltd., low stereoregular polypropylene "L-MODU S400" (trade name)) were linearly applied onto the nonwoven fabric at a resin temperature of 205° C. and a travelling speed of 10 m/min so as to become perpendicular to the longitudinal direction of the perforated central tube from an inside end to an outside end in the winding direction when a separation membrane element was formed, while adjusting the temperature of a backup roll to 20° C., thereby preparing the permeate-side channel material. The nonwoven fabric had a thickness of 0.07 mm, a basis weight of 35 g/m², and an embossed pattern (a circle with a diameter of 1 mm, a lattice with a pitch of 5 mm).

The prepared permeate-side channel material was cut, placed on the permeate-side face of the separation membrane, and spirally wound around a perforated central tube (width: 350 mm, diameter: 18 mm, 10 pores×1 row of straight lines) made of ABS (acrylonitrile-butadiene-styrene), and a film having discharge ports for the feed fluid was wound around the outer peripheral end. For the discharge ports for the feed fluid, a pore with a width of 40 mm and a height of 10 mm was provided at four sites along the width direction and provided at four sites along the height direction within a region having a width of 200 mm at the center portion of the film. Edge cutting was performed at both ends of the obtained wound body, and a cap was attached to one end face of the wound body, thereby preparing a separation membrane element having an effective membrane area of 1.54 m² and a diameter of 3 inches.

One separation membrane element was loaded in a vessel and the feed fluid was fed from one end face of the separation membrane element at a recovery ratio of 90%. The performances were evaluated under the above conditions. The results were shown in Table 1.

Example 2

A separation membrane element was prepared in the same manner as in Example 1 except that the number of the separation membrane pair was changed to five with three I-type separation membrane pairs and two reverse L-type separation membrane pairs, and the performances were evaluated. The results were shown in Table 1.

Example 3

A separation membrane element was prepared in the same manner as in Example 1 except that the number of the separation membrane pair was changed to four with three I-type separation membrane pairs and one reverse L-type separation membrane pair, and the performances were evaluated. The results were shown in Table 1.

Example 4

A separation membrane element was prepared in the same manner as in Example 1 except that the number of the I-type separation membrane pair was changed to five and the number of the reverse L-type separation membrane pair was changed to one, and the performances were evaluated. The results were shown in Table 1.

Example 5

A separation membrane element was prepared in the same manner as in Example 1 except that the outer diameter of the separation membrane element was changed to 8 inches, the width thereof was changed to 0.92 m, the number of the separation membrane pair was changed to 24 with 16 I-type separation membrane pairs and 8 reverse L-type separation membrane pairs, whereby the effective membrane area was changed to 28.0 m², and the perforated central tube was changed (width: 1050 mm, diameter: 28 mm, 40 pores×2 rows of straight lines), and the performances were evaluated. The results were shown in Table 1.

Example 6

A separation membrane element was prepared in the same manner as in Example 1 except that: among six separation membrane pairs, five were L-type separation membrane pairs and one was I-type separation membrane pair; L-type separation membrane pairs were continuously coated with an adhesive from the outside to the inside in the winding direction such that the closing ratio on one end face was 90%, and the closing ratio was 0% on the other end face and 100% on the outer peripheral end; and the I-type separation membrane pair had a closing ratio of 100% on the outer peripheral end and a closing ratio of 0% both on the one end face and the other end face. The feed fluid was fed from the outer peripheral end of the obtained separation membrane element, and the performances were evaluated. The results were shown in Table 1.

Example 7

A separation membrane element was prepared in the same manner as in Example 6 except that the outer diameter of the separation membrane element was changed to 8 inches, the width thereof was changed to 0.92 m, the number of the separation membrane pair was changed to 24 with 16 L-type separation membrane pairs and 8 I-type separation membrane pairs, whereby the effective membrane area was changed to 28.0 m², and the perforated central tube was changed (width: 1050 mm, diameter: 28 mm, 40 pores×2 rows of straight lines), and the performances were evaluated. The results were shown in Table 1.

Example 8

A separation membrane element was prepared in the same manner as in Example 1 except that: among six separation membrane pairs, five were reverse L-type separation membrane pairs and one was L-type separation membrane pair; the reverse L-type separation membrane pairs were continuously coated with an adhesive from the outside to the inside in the winding direction such that the closing ratio on one end face was 90%, and the closing ratio was 100% on the other end face and 0% on the outer peripheral end; and the L-type separation membrane pairs were continuously coated with an adhesive from the outside to the inside in the winding direction such that the closing ratio on the other end face was 90%, and the closing ratio was 100% on one end face and 0% on the outer peripheral end, and the performances were evaluated. The results were shown in Table 1.

Example 9

A separation membrane element was prepared in the same manner as in Example 8 except that the outer diameter of the separation membrane element was changed to 8 inches, the width thereof was changed to 0.92 m, the number of the separation membrane pair was changed to 24 with 16 reverse L-type separation membrane pairs and 8 L-type separation membrane pairs, whereby the effective membrane area was changed to 28.0 m², and the perforated central tube was changed (width: 1050 mm, diameter: 28 mm, 40 pores×2 rows of straight lines), and the performances were evaluated. The results were shown in Table 1.

Example 10

A separation membrane element was prepared in the same manner as in Example 1 except that the cross sectional area ratio of the permeate-side channel material was changed to 0.75, and the performances were evaluated. The results were shown in Table 1.

Example 11

A separation membrane element was prepared and performances thereof were evaluated in the same manner as in Example 1 except that the operation was performed at a recovery ratio of 75%. The results were shown in Table 2.

Example 12

A separation membrane element was prepared and performances thereof were evaluated in the same manner as in Example 1 except that the operation was performed at a recovery ratio of 50%. The results were shown in Table 2.

Example 13

A separation membrane element was prepared and performances thereof were evaluated in the same manner as in Example 1 except that the operation was performed at a recovery ratio of 30%. The results were shown in Table 2.

Example 14

A separation membrane element was prepared in the same manner as in Example 1 except that the adhesive was intermittently applied such that the closing ratios on the other end faces of the four I-type separation membrane pairs were 50%, and the performances were evaluated. The results were shown in Table 2.

Example 15

A separation membrane element was prepared in the same manner as in Example 1 except that the four I-type separation membrane pairs were continuously coated with an adhesive from the outside to the inside in the winding direction such that the closing ratios on the other end faces thereof were 10%, and the performances were evaluated. The results were shown in Table 2.

Example 16

A separation membrane element was prepared in the same manner as in Example 1 except that the four I-type separation membrane pairs were continuously coated with an adhesive from the outside to the inside in the winding direction such that the closing ratios on the other end faces thereof were 10%, and the four I-type separation membrane pairs were continuously coated with an adhesive from the inside to the outside in the winding direction such that the closing ratios on one end faces thereof were 50%, and the performances were evaluated. The results were shown in Table 2.

Example 17

A separation membrane element was prepared in the same manner as in Example 1 except that the pitch of the feed-side channel material of the reverse L-type separation membrane pair was changed to 2.5 mm×2.5 mm, and the performances were evaluated. The results were shown in Table 2.

Example 18

A separation membrane element was prepared in the same manner as in Example 1 except that the pitch of the feed-side channel material of the reverse L-type separation membrane pair was changed to 2.0 mm×3.0 mm so as to change the inclination angle of the net constituent yarns to 56°, and the performances were evaluated. The results were shown in Table 2.

Example 19

A separation membrane element was prepared in the same manner as in Example 1 except that the length of the separation membrane pair was changed to 0.95 m, the number of the first separation membrane pair was changed to three, and the number of the second separation membrane pair was changed to one, and the performances were evaluated. The results were shown in Table 2.

Example 20

A separation membrane element was prepared in the same manner as in Example 1 except that the length of the separation membrane pair was changed to 0.42 m, the number of the first separation membrane pair was changed to six, and the number of the second separation membrane pair was changed to three, and the performances were evaluated. The results were shown in Table 2.

Example 21

A separation membrane element was prepared in the same manner as in Example 1 except that the length of the separation membrane pair was changed to 1.26 m, the number of the first separation membrane pair was changed to two, and the number of the second separation membrane pair was changed to one, and the performances were evaluated. The results were shown in Table 3.

Example 22

A separation membrane element was prepared in the same manner as in Example 1 except that the length of the separation membrane pair was changed to 1.26 m, the width of the separation membrane pair changed to 0.15 m, the number of the first separation membrane pair was changed to six, and the number of the second separation membrane pair was changed to three, and the performances were evaluated. The results were shown in Table 3.

Comparative Example 1

A separation membrane element was prepared in the same manner as in Example 1 except that all six separation membrane pairs were changed to I-type separation membrane pairs. The feed fluid was fed so as to be fed from one end face of the wound body and discharged from the other end face, and the performances were evaluated. The results were shown in Table 3.

Comparative Example 2

A separation membrane element was prepared in the same manner as in Example 1 except that all six separation membrane pairs were changed to L-type separation membrane pairs. The feed fluid was fed so as to be fed from the outer peripheral end of the wound body and discharged from one end face, and the performances were evaluated. The results were shown in Table 3.

Comparative Example 3

A separation membrane element was prepared in the same manner as in Example 5 except that all 24 separation membrane pairs were changed to I-type separation membrane pairs. The feed fluid was fed so as to be fed from one end face of the wound body and discharged from the other end face, and the performances were evaluated. The results were shown in Table 3.

Comparative Example 4

A separation membrane element was prepared in the same manner as in Example 7 except that all 24 separation membrane pairs were changed to L-type separation membrane pairs. The feed fluid was fed so as to be fed from one end face of the wound body and discharged from the other end face, and the performances were evaluated. The results were shown in Table 3.

TABLE 1

| | | | | Ex. 1 | Ex. 2 | Ex. 3 | Ex. 4 | Ex. 5 |
|---|---|---|---|---|---|---|---|---|
| Form of separation membrane element | | Diameter | Inch | 3 | 3 | 3 | 3 | 8 |
| | | Width of separation membrane pair | m | 0.20 | 0.20 | 0.20 | 0.20 | 0.92 |
| | | Length of separation membrane pair | m | 0.63 | 0.63 | 0.63 | 0.63 | 0.63 |
| | First separation membrane pair | Form | — | I | I | I | I | I |
| | | | — | FIG. 2 | FIG. 2 | FIG. 2 | FIG. 2 | FIG. 2 |
| | | Number | — | 4 | 3 | 3 | 5 | 16 |
| | | Feed-side channel material Thickness | mm | 0.3 | 0.3 | 0.3 | 0.3 | 0.3 |
| | | Pitch | mm × mm | 1.5 × 1.5 | 1.5 × 1.5 | 1.5 × 1.5 | 1.5 × 1.5 | 1.5 × 1.5 |
| | | Inclination angle | ° | 45 | 45 | 45 | 45 | 45 |
| | | Permeate-side channel material Cross sectional area ratio | — | 0.6 | 0.6 | 0.6 | 0.6 | 0.6 |
| | Second separation membrane pair | Form | — | Reverse L | Reverse L | Reverse L | Reverse L | Reverse L |
| | | | — | FIG. 4 | FIG. 4 | FIG. 4 | FIG. 4 | FIG. 4 |
| | | Number | — | 2 | 2 | 1 | 1 | 8 |
| | | Feed-side channel material Thickness | mm | 0.3 | 0.3 | 0.3 | 0.3 | 0.3 |
| | | Pitch | mm × mm | 1.5 × 1.5 | 1.5 × 1.5 | 1.5 × 1.5 | 1.5 × 1.5 | 1.5 × 1.5 |
| | | Inclination angle | ° | 45 | 45 | 45 | 45 | 45 |
| | | Permeate-side channel material Cross sectional area ratio | — | 0.6 | 0.6 | 0.6 | 0.6 | 0.6 |
| | | Total number of separation membrane pairs | — | 6 | 5 | 4 | 6 | 24 |
| | | Effective membrane area | m² | 1.54 | 1.54 | 1.54 | 1.54 | 28.0 |
| Operation condition | | Recovery ratio | % | 90 | 90 | 90 | 90 | 90 |
| Performance | | Fresh water production rate | L/min | 1.05 | 1.04 | 1.03 | 1.04 | 34.7 |
| | | Desalination Ratio | % | 94.9 | 94.8 | 94.6 | 94.4 | 94.8 |

TABLE 1-continued

|  |  |  |  | Ex. 6 | Ex. 7 | Ex. 8 | Ex. 9 | Ex. 10 |
|---|---|---|---|---|---|---|---|---|
| Form of separation membrane element | Diameter |  | Inch | 3 | 8 | 3 | 8 | 3 |
|  | Width of separation membrane pair |  | m | 0.20 | 0.92 | 0.20 | 0.92 | 0.20 |
|  | Length of separation membrane pair |  | m | 0.63 | 0.63 | 0.63 | 0.63 | 0.63 |
|  | First separation membrane pair | Form | — | L | L | Reverse L | Reverse L | I |
|  |  |  | — | FIG. 6 | FIG. 6 | FIG. 5 | FIG. 5 | FIG. 2 |
|  |  | Number | — | 5 | 16 | 5 | 16 | 4 |
|  |  | Feed-side channel material Thickness | mm | 0.3 | 0.3 | 0.3 | 0.3 | 0.3 |
|  |  | Pitch | mm × mm | 1.5 × 1.5 | 1.5 × 1.5 | 1.5 × 1.5 | 1.5 × 1.5 | 1.5 × 1.5 |
|  |  | Inclination angle | ° | 45 | 45 | 45 | 45 | 45 |
|  |  | Permeate-side channel material Cross sectional area ratio | — | 0.6 | 0.6 | 0.6 | 0.6 | 0.75 |
|  | Second separation membrane pair | Form | — | I | I | L | L | Reverse L |
|  |  |  | — | FIG. 3 | FIG. 3 | FIG. 6 | FIG. 6 | FIG. 4 |
|  |  | Number | — | 1 | 8 | 1 | 8 | 2 |
|  |  | Feed-side channel material Thickness | mm | 0.3 | 0.3 | 0.3 | 0.3 | 0.3 |
|  |  | Pitch | mm × mm | 1.5 × 1.5 | 1.5 × 1.5 | 1.5 × 1.5 | 1.5 × 1.5 | 1.5 × 1.5 |
|  |  | Inclination angle | ° | 45 | 45 | 45 | 45 | 45 |
|  |  | Permeate-side channel material Cross sectional area ratio | — | 0.6 | 0.6 | 0.6 | 0.6 | 0.75 |
|  | Total number of separation membrane pairs |  | — | 6 | 24 | 6 | 24 | 6 |
|  | Effective membrane area |  | m² | 1.54 | 28.0 | 1.54 | 28.0 | 1.54 |
| Operation condition | Recovery ratio |  | % | 90 | 90 | 90 | 90 | 90 |
| Performance | Fresh water production rate |  | L/min | 1.02 | 34 | 1.02 | 33.8 | 0.99 |
|  | Desalination Ratio |  | % | 94.7 | 94.5 | 95 | 95.5 | 94.6 |

TABLE 2

|  |  |  |  | Ex. 11 | Ex. 12 | Ex. 13 | Ex. 14 | Ex. 15 |
|---|---|---|---|---|---|---|---|---|
| Form of separation membrane element | Diameter |  | Inch | 3 | 3 | 3 | 3 | 3 |
|  | Width of separation membrane pair |  | m | 0.20 | 0.20 | 0.20 | 0.20 | 0.20 |
|  | Length of separation membrane pair |  | m | 0.63 | 0.63 | 0.63 | 0.63 | 0.63 |
|  | First separation membrane pair | Form | — | I | I | I | I | I |
|  |  |  | — | FIG. 2 | FIG. 2 | FIG. 2 | FIG. 2 | FIG. 2 |
|  |  | Number | — | 4 | 4 | 4 | 4 | 4 |
|  |  | Feed-side channel material Thickness | mm | 0.3 | 0.3 | 0.3 | 0.3 | 0.3 |
|  |  | Pitch | mm × mm | 1.5 × 1.5 | 1.5 × 1.5 | 1.5 × 1.5 | 1.5 × 1.5 | 1.5 × 1.5 |
|  |  | Inclination angle | ° | 45 | 45 | 45 | 45 | 45 |
|  |  | Permeate-side channel material Cross sectional area ratio | — | 0.6 | 0.6 | 0.6 | 0.6 | 0.6 |
|  | Second separation membrane pair | Form | — | Reverse L | Reverse L | Reverse L | Reverse L | Reverse L |
|  |  |  | — | FIG. 4 | FIG. 4 | FIG. 4 | FIG. 4 | FIG. 4 |
|  |  | Number | — | 2 | 2 | 2 | 2 | 2 |
|  |  | Feed-side channel material Thickness | mm | 0.3 | 0.3 | 0.3 | 0.3 | 0.3 |
|  |  | Pitch | mm × mm | 1.5 × 1.5 | 1.5 × 1.5 | 1.5 × 1.5 | 1.5 × 1.5 | 1.5 × 1.5 |
|  |  | Inclination angle | ° | 45 | 45 | 45 | 45 | 45 |
|  |  | Permeate-side channel material Cross sectional area ratio | — | 0.6 | 0.6 | 0.6 | 0.6 | 0.6 |
|  | Total number of separation membrane pairs |  | — | 6 | 6 | 6 | 6 | 6 |
|  | Effective membrane area |  | m² | 1.54 | 1.54 | 1.54 | 1.54 | 1.54 |
| Operation condition | Recovery ratio |  | % | 75 | 50 | 30 | 90 | 90 |
| Performance | Fresh water production rate |  | L/min | 1.09 | 1.09 | 1.03 | 1.05 | 1.04 |
|  | Desalination Ratio |  | % | 96.7 | 97.7 | 98.0 | 95.5 | 95.4 |

|  |  |  |  | Ex. 16 | Ex. 17 | Ex. 18 | Ex. 19 | Ex. 20 |
|---|---|---|---|---|---|---|---|---|
| Form of separation membrane element | Diameter |  | Inch | 3 | 3 | 3 | 3 | 3 |
|  | Width of separation membrane pair |  | m | 0.20 | 0.20 | 0.20 | 0.20 | 0.20 |
|  | Length of separation membrane pair |  | m | 0.63 | 0.63 | 0.63 | 0.95 | 0.42 |
|  | First separation membrane pair | Form | — | I | I | I | I | I |
|  |  |  | — | FIG. 2 | FIG. 2 | FIG. 2 | FIG. 2 | FIG. 2 |
|  |  | Number | — | 4 | 4 | 4 | 3 | 6 |
|  |  | Feed-side channel material Thickness | mm | 0.3 | 0.3 | 0.3 | 0.3 | 0.3 |
|  |  | Pitch | mm × mm | 1.5 × 1.5 | 1.5 × 1.5 | 1.5 × 1.5 | 1.5 × 1.5 | 1.5 × 1.5 |
|  |  | Inclination angle | ° | 45 | 45 | 45 | 45 | 45 |
|  |  | Permeate-side channel material Cross sectional area ratio | — | 0.6 | 0.6 | 0.6 | 0.6 | 0.6 |
|  | Second separation membrane pair | Form | — | Reverse L | Reverse L | Reverse L | Reverse L | Reverse L |
|  |  |  | — | FIG. 4 | FIG. 4 | FIG. 4 | FIG. 4 | FIG. 4 |
|  |  | Number | — | 2 | 2 | 2 | 1 | 3 |
|  |  | Feed-side channel material Thickness | mm | 0.3 | 0.3 | 0.3 | 0.3 | 0.3 |
|  |  | Pitch | mm × mm | 1.5 × 1.5 | 2.5 × 2.5 | 2×3 | 1.5 × 1.5 | 1.5 × 1.5 |
|  |  | Inclination angle | ° | 45 | 45 | 56 | 45 | 45 |

TABLE 2-continued

|  |  |  | | | | | |
|---|---|---|---|---|---|---|---|
| | Permeate-side channel material | Cross sectional area ratio | — | 0.6 | 0.6 | 0.6 | 0.6 | 0.6 |
| | Total number of separation membrane pairs | | — | 6 | 6 | 6 | 4 | 9 |
| | Effective membrane area | | m² | 1.54 | 1.54 | 1.54 | 1.54 | 1.54 |
| Operation condition | Recovery ratio | | % | 90 | 90 | 90 | 90 | 90 |
| Performance | Fresh water production rate | | L/min | 1.03 | 1.07 | 1.07 | 1.01 | 1.04 |
| | Desalination Ratio | | % | 95.5 | 94.9 | 94.9 | 95.6 | 95.6 |

TABLE 3

| | | | | Ex. 21 | Ex. 22 | Comp. Ex. 1 |
|---|---|---|---|---|---|---|
| Form of separation membrane element | | Diameter | Inch | 3 | 3 | 3 |
| | | Width of separation membrane pair | m | 0.20 | 0.15 | 0.20 |
| | | Length of separation membrane pair | m | 1.26 | 1.26 | 0.63 |
| | First separation membrane pair | Form | — | I | I | I |
| | | | — | FIG. 2 | FIG. 2 | FIG. 2 |
| | | Number | — | 2 | 6 | 6 |
| | | Feed-side channel material Thickness | mm | 0.3 | 0.3 | 0.3 |
| | | Pitch | mm × mm | 1.5 × 1.5 | 1.5 × 1.5 | 1.5 × 1.5 |
| | | Inclination angle | ° | 45 | 45 | 45 |
| | | Permeate-side channel material Cross sectional area ratio | — | 0.6 | 0.6 | 0.6 |
| | Second separation membrane pair | Form | — | Reverse L | Reverse L | — |
| | | | — | FIG. 4 | FIG. 4 | — |
| | | Number | — | 1 | 3 | 0 |
| | | Feed-side channel material Thickness | mm | 0.3 | 0.3 | — |
| | | Pitch | mm × mm | 1.5 × 1.5 | 1.5 × 1.5 | — |
| | | Inclination angle | ° | 45 | 45 | — |
| | | Permeate-side channel material Cross sectional area ratio | — | 0.6 | 0.6 | — |
| | Total number of separation membrane pairs | | — | 3 | 4 | 6 |
| | Effective membrane area | | m² | 1.54 | 1.54 | 1.54 |
| Operation condition | Recovery ratio | | % | 90 | 90 | 90 |
| Performance | Fresh water production rate | | L/min | 1 | 0.93 | 1.01 |
| | Desalination Ratio | | % | 95.5 | 95.4 | 93.0 |

| | | | | Comp. Ex. 2 | Comp. Ex. 3 | Comp. Ex. 4 |
|---|---|---|---|---|---|---|
| Form of separation membrane element | | Diameter | Inch | 3 | 8 | 8 |
| | | Width of separation membrane pair | m | 0.20 | 0.92 | 0.92 |
| | | Length of separation membrane pair | m | 0.63 | 0.63 | 0.63 |
| | First separation membrane pair | Form | — | L | I | L |
| | | | — | FIG. 6 | FIG. 2 | FIG. 6 |
| | | Number | — | 6 | 24 | 24 |
| | | Feed-side channel material Thickness | mm | 0.3 | 0.3 | 0.3 |
| | | Pitch | mm × mm | 1.5 × 1.5 | 1.5 × 1.5 | 1.5 × 1.5 |
| | | Inclination angle | ° | 45 | 45 | 45 |
| | | Permeate-side channel material Cross sectional area ratio | — | 0.6 | 0.6 | 0.6 |
| | Second separation membrane pair | Form | — | — | — | — |
| | | | — | — | — | — |
| | | Number | — | 0 | 0 | 0 |
| | | Feed-side channel material Thickness | mm | — | — | — |
| | | Pitch | mm × mm | — | — | — |
| | | Inclination angle | ° | — | — | — |
| | | Permeate-side channel material Cross sectional area ratio | — | — | — | — |
| | Total number of separation membrane pairs | | — | 6 | 24 | 24 |
| | Effective membrane area | | m² | 1.54 | 28.0 | 28.0 |
| Operation condition | Recovery ratio | | % | 90 | 90 | 90 |
| Performance | Fresh water production rate | | L/min | 1.03 | 34.5 | 34.1 |
| | Desalination Ratio | | % | 94.6 | 93.8 | 94.2 |

DESCRIPTION OF REFERENCE NUMERALS AND SIGNS

1 Separation membrane element
2 Perforated central tube
21 Pore
3 Separation membrane
31 Separation membrane pair
4 Feed-side channel material
5 Permeate-side channel material
6 Membrane unit
61 Wound body
71, 72 Telescope prevention plate
73 Cap
8 Flow channel closed portion
101 Feed fluid
102 Permeated fluid
103 Concentrated fluid
104 Intermediate fluid
H Thickness of permeate-side channel material
P Interval between center of protruding portion of permeate-side channel material and center of another protruding portion adjacent thereto
S Cross sectional area of protruding portion of permeate-side channel material

The invention claimed is:

1. A separation membrane element comprising:
a perforated central tube;
a plurality of separation membrane pairs each of which comprises a separation membrane having a feed-side face and a permeate-side face, the plurality of separation membrane pairs being arranged so that the permeate-side face each other;
a feed-side channel material provided between the feed-side faces of the separation membrane pair; and
a permeate-side channel material provided between the permeate-side faces of the separation membrane pairs,
wherein in the separation membrane pairs, the feed-side channel material, and the permeate-side channel material are wound around the perforated central tube to form a wound body,
in the feed-side faces of the separation membrane pair, among four portions of end faces and ends which include one end face and the other end face in a longitudinal direction of the perforated central tube and an inner peripheral end and an outer peripheral end in a direction perpendicular to the longitudinal direction of the perforated central tube, two or more portions of the end faces or ends are open by 5% or more, respectively,
the plurality of separation membrane pairs comprise at least one first separation membrane pair and at least one second separation membrane pair,
the first separation membrane pair and the second separation membrane pair are different from each other in a combination of the open end faces or ends,
in the feed-side faces of the first separation membrane pair and the second separation membrane pair, the combination of the open end faces or ends has the following configuration (i) or (ii):
(i) in the first separation membrane pair, one end face and the other end face are open, and the outer peripheral end is closed, and
in the second separation membrane pair, one end face is open, the other end face is closed, and the outer peripheral end is open; or
(ii) in the first separation membrane pair, one end face is open, the other end face is closed, and the outer peripheral end is open, and
in the second separation membrane pair, one end face and the other end face are open, and the outer peripheral end is closed, and
a U-turn cap, for feeding a fluid discharged from the first separation membrane pair to the second separation membrane pair, is provided on one end face of the wound body.

2. The separation membrane element according to claim 1, wherein a proportion of the number of the first separation membrane pair to a total number of the separation membrane pairs is 55% to 90%.

3. The separation membrane element according to claim 1, wherein a ratio (L/W) of a length L of the separation membrane pair to a width W of the separation membrane pair is 2.5 to 8.

4. The separation membrane element according to claim 1, wherein the feed-side channel material provided between the feed-side faces of the first separation membrane pair and the feed-side channel material provided between the feed-side faces of the second separation membrane pair are different from each other.

5. A separation membrane element comprising:
a perforated central tube;
a plurality of separation membrane pairs each of which comprises a separation membrane having a feed-side face and a permeate-side face, the plurality of separation membrane pairs being arranged so that the permeate-side face each other;
a feed-side channel material provided between the feed-side faces of the separation membrane pair; and
a permeate-side channel material provided between the permeate-side faces of the separation membrane pairs,
wherein in the separation membrane pairs, the feed-side channel material, and the permeate-side channel material are wound around the perforated central tube to form a wound body,
in the feed-side faces of the separation membrane pair, among four portions of end faces and ends which include one end face and the other end face in a longitudinal direction of the perforated central tube and an inner peripheral end and an outer peripheral end in a direction perpendicular to the longitudinal direction of the perforated central tube, two or more portions of the end faces or ends are open by 5% or more, respectively,
the plurality of separation membrane pairs comprise at least one first separation membrane pair and at least one second separation membrane pair,
the first separation membrane pair and the second separation membrane pair are different from each other in a combination of the open end faces or ends,
in each of the first separation membrane pair and the second separation membrane pair, one end face is open, the other end face is closed, and the outer peripheral end is open, and
a channel material is provided on an outer periphery of the wound body, and an outer periphery of the channel material is covered with a water impermeable sheet.

6. The separation membrane element according to claim 5, wherein a proportion of the number of the first separation membrane pair to a total number of the separation membrane pairs is 55% to 90%.

7. The separation membrane element according to claim 5, wherein a ratio (L/W) of a length L of the separation membrane pair to a width W of the separation membrane pair is 2.5 to 8.

8. The separation membrane element according to claim 5, wherein the feed-side channel material provided between the feed-side faces of the first separation membrane pair and the feed-side channel material provided between the feed-side faces of the second separation membrane pair are different from each other.

* * * * *